(12) United States Patent
Israni et al.

(10) Patent No.: US 8,257,769 B2
(45) Date of Patent: Sep. 4, 2012

(54) PROCESS FOR RECOVERING VOLATILE TEA COMPOUNDS

(75) Inventors: Sameer Harnam Israni, Mumbai (IN); Vijay Mukund Naik, Mumbai (IN); Gurmeet Singh, Bangalore (IN); Suranjan Sircar, Kolkata (IN)

(73) Assignee: Conopco, Inc., Englewood Cliffs, NJ (US)

( * ) Notice: Subject to any disclaimer, the term of this patent is extended or adjusted under 35 U.S.C. 154(b) by 880 days.

(21) Appl. No.: 12/316,204

(22) Filed: Dec. 10, 2008

(65) Prior Publication Data

US 2009/0169692 A1    Jul. 2, 2009

(30) Foreign Application Priority Data

Dec. 14, 2007 (IN) .......................... 2456/MUM/2007
Apr. 10, 2008 (EP) ....................................... 08154310

(51) Int. Cl.
  *A23L 2/00* (2006.01)
(52) U.S. Cl. ........ 426/435; 426/481; 426/492; 426/494; 426/597
(58) Field of Classification Search .................. 426/597, 426/435, 481, 492, 494
  See application file for complete search history.

(56) References Cited

U.S. PATENT DOCUMENTS

| | | | |
|---|---|---|---|
| 3,717,472 A | 2/1973 | Strobel | 99/65 |
| 3,782,972 A * | 1/1974 | Atkins et al. | 426/592 |
| 5,171,595 A * | 12/1992 | Hsu et al. | 426/329 |
| 6,030,622 A | 2/2000 | Shehadeh | 424/195.1 |
| 6,251,193 B1 * | 6/2001 | Rossy et al. | 127/2 |

FOREIGN PATENT DOCUMENTS

| | | |
|---|---|---|
| EP | 1 767 200 | 3/2007 |
| GB | 853834 | 2/1957 |
| GB | 855423 | 3/1957 |
| GB | 1061009 | 2/1965 |
| GB | 1 490 370 | 11/1977 |
| JP | 2007-135494 | 6/2007 |
| WO | 2004/054379 | 7/2004 |
| WO | 2004/056382 | 7/2004 |
| WO | 2006/036638 | 4/2006 |
| WO | 2007/039018 | 4/2007 |
| WO | 2008/036809 | 3/2008 |

OTHER PUBLICATIONS

PCT International Search Report in a PCT application PCT/EP2008/010832.
EP Search Report in an EP application EP 08 15 4310.
EP Search Report in an EP application EP 08 15 4305.
EP Search Report in an EP application EP 08 15 4304.
Japanese Abstract 2007-135494—published Jun. 7, 2007.
China Abstract CN1082327—published Feb. 23, 1994 (Tea comprehensive processing and utilization method).
Gautam et al., "*Immunoadjuvant potential of Asparagus racemosus aqueous extract in experimental system*", Journal of Ethnopharmacology, *2004) vol. 91, pp. 251-255.

(Continued)

*Primary Examiner* — Helen F Heggestad
(74) *Attorney, Agent, or Firm* — Ellen Plotkin

(57) ABSTRACT

Disclosed is a process for recovering volatile compounds from an aqueous tea extract by distilling the said extract by fractional distillation comprising condensing of vapors, separating the oil phase condensate from the aqueous phase and refluxing the substantially oil-free aqueous phase.

9 Claims, 1 Drawing Sheet

OTHER PUBLICATIONS

Siripurapu et al., "*Adaptogenic and anti-amnesic properties of Evolvulus alsinoides in rodents*" Pharmacology, Biochemistry and Behavior, (2005), vol. 81, pp. 424-432.

"*Rasavana Prash: A Herbal Food for Immunity Promotion*", Chakrapani website, Chakrapani Ayurveda Clinic & Research Center, India; 2004.

Co-pending Application: Applicant: Banerjee et al., U.S. Appl. No. 12/316,205, filed Dec. 10, 2008.

Co-pending Application: Applicant: Banerjee et al., U.S. Appl. No. 12/316,203, filed Dec. 10, 2008.

PCT International Search Report in a PCT application PCT/EP2008/010834.

Abstract of JP 2007-135494—published Jun. 7, 2007.

* cited by examiner

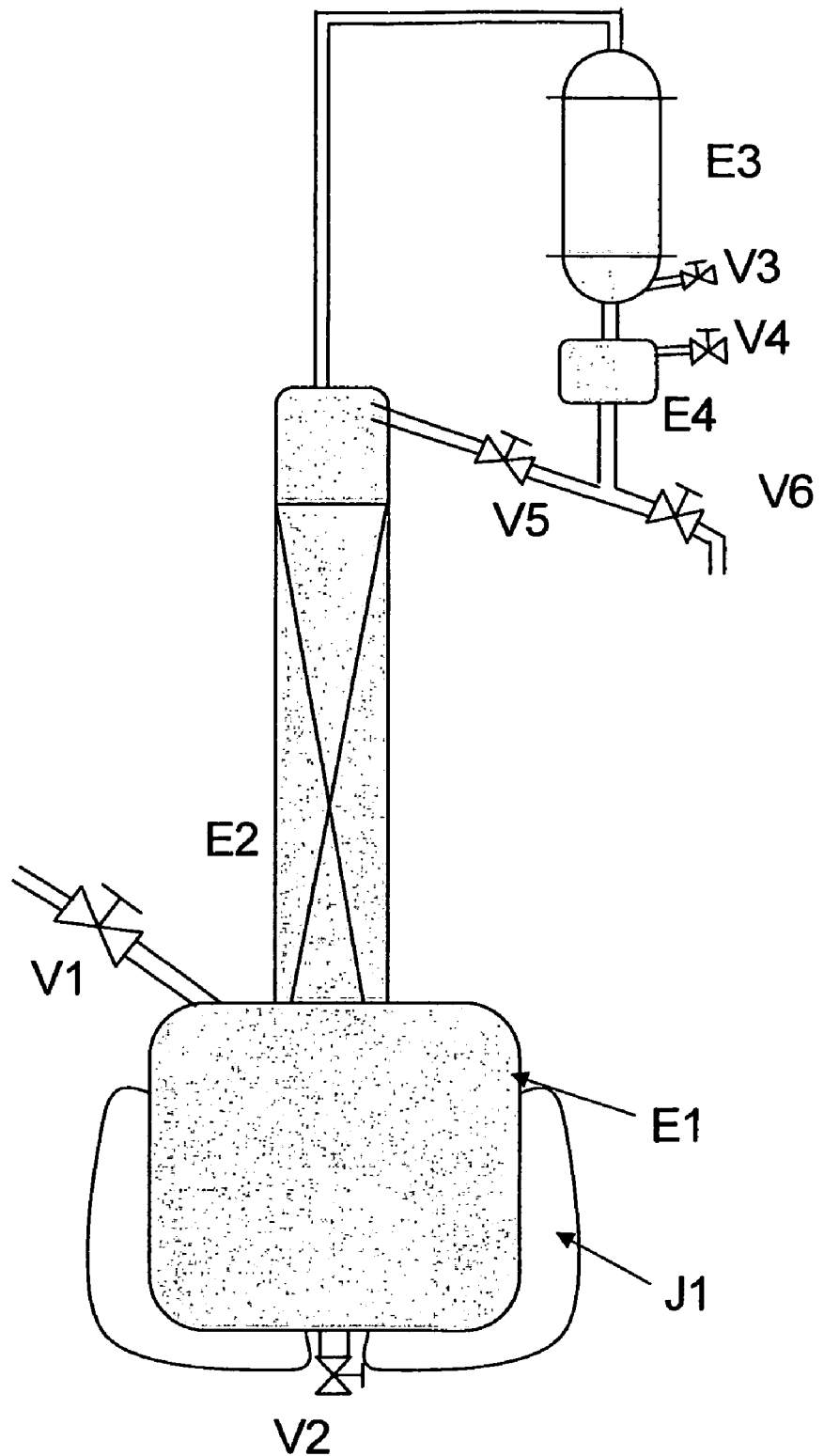

PROCESS FOR RECOVERING VOLATILE TEA COMPOUNDS

TECHNICAL FIELD

The invention relates to a process for recovering volatile compounds from an aqueous tea extract. The invention particularly relates to a process for recovering and concentrating tea volatile compounds e.g. aroma compounds from dilute aqueous tea condensate streams and other waste steams.

BACKGROUND OF THE INVENTION

Tea is one of the most widely consumed beverage in the world. Tea is available in many forms e.g. as green tea, black tea, hot instant tea, iced tea etc.

Green tea is generally prepared by heat treating (e.g. by steaming or pan-frying) freshly picked leaves to arrest enzyme action and then subjecting the leaves to a series of drying and rolling steps.

Black tea is generally prepared by subjecting freshly picked tea leaves to a series of processing conditions including withering and macerating the fresh tea leaves, followed by fermentation which mainly contributes to the characteristic colour, flavour and aroma of black tea. The tea is dried at high temperature after fermentation to arrest the enzyme action and to bring down the moisture to a low level.

Green tea and black tea are products which are brewed in hot water to produce tea infusions in the hot water wherefrom the tea leaf insolubles have to be filtered before the infusions are consumed. Hot instant tea is a product which contains no water insolubles. This hot instant tea product is fully soluble in hot water and this solubilized product can be consumed as such without any filtration. Iced tea is a product made from tea where the fully water-soluble fractions of tea are dissolved in water with or without additional flavours and the dissolved tea solution is kept chilled in a refrigerator before it is consumed.

The process for the preparation of hot instant tea and iced tea are described in literature. One such description can be found in the reference book 'Tea—Cultivation to Consumption' edited by K. C. Wilson & M. N. Clifford & published by Chapman & Hall (1992).

Many tea manufacturing processes produce by-product streams that contain aroma volatile compounds. In the leaf tea manufacture process, the dryer exhaust containing aroma volatiles can be cooled to obtain an aqueous condensate containing aroma volatile compounds. The evaporator condensate stream in instant tea manufacturing processes also contains aroma volatile compounds. However, the aroma in these condensate streams is usually present at very low levels. Typically the concentration of aroma volatiles in the condensate streams is below 500 mg/l, and often less than 50 mg/l and can be as low as 10 mg/l. This dilute nature of the aroma in the condensate streams restricts their application as a source of aroma for add-back. These condensate steams are often not utilized or are limited in their use due to the extremely low concentrations. In many cases these streams are even discarded, leading to loss of precious aroma bearing compounds. This is because the known processes for recovery of these compounds are either not technically and/or commercially viable or are very inefficient. Tea aroma is one of the most important factors for determining tea quality. Hence tea with good aroma profile fetches a premium in the market. Recovery of aroma volatile compounds from the condensate streams can provide a source of natural tea aroma that can be used for add-back and improving the aroma of the tea.

Many processes to recover and concentrate volatile compounds from dilute streams have been known and practised. These processes include reverse osmosis, distillation, cryo-concentration, freeze drying, staged/partial condensation and pressure swing adsorption. Distillation has always been one preferred process. GB 1061009 (Salada Foods, 1967) describes a process for recovery of aroma from aqueous tea streams using distillation carried out in an inert atmosphere. The present inventors have determined that using the method described in the GB publication, the quality of the tea aroma recaptured improves to a small extent but a large percentage of the aroma present in the tea aqueous extract can not be recovered using this process and there are high losses.

It is thus an object of the present invention to overcome or ameliorate at least one of the disadvantages of the prior art.

It is an object of the present invention to provide for a process for the enhanced recovery of volatile compounds from aqueous tea extract streams like condensate streams from hot instant tea and ice tea manufacture.

It is another object of the present invention to provide for a process for the recovery of volatile compounds like aroma compounds in more concentrated forms as compared to known processes of the prior art.

SUMMARY OF THE INVENTION

According to the first aspect of the present invention there is provided a process for recovering volatile compounds from an aqueous tea extract by distilling the said extract by fractional distillation comprising condensing of vapours, separating the oil phase condensate from the aqueous phase and refluxing the substantially oil-free aqueous phase.

It is particularly preferred that that the distilling is carried out at not less than 0.7 bar absolute pressure.

It is further particularly preferred that the fractional distillation is carried out in a distillation assembly that contains less than 5 volume percent of non-condensable gases prior commencing the distillation operation.

It is even further particularly preferably that the distillation assembly is filled with steam before commencing the distillation operation.

According to a second aspect of the present invention there is provided a process for producing tea with enhanced aroma comprising mixing tea with the volatile compounds recovered by the first aspect of the invention.

DETAILED DESCRIPTION OF THE INVENTION

Tea

"Tea" for the purposes of the present invention means material from *Camellia sinensis* var. *sinensis* or *Camellia sinensis* var. *assamica*. It also includes rooibos tea obtained from *Aspalathus linearis*. "Tea" is also intended to include the product of blending two or more of any of these materials.

The aqueous tea extract of this invention could be from any of the following tea sources: fermented tea (i.e. black tea), semi-fermented tea (i.e. oolong tea) and/or substantially unfermented tea (i.e. green tea). "Fermentation" refers to the oxidative and hydrolytic process that tea undergoes when certain endogenous enzymes and substrates are brought together, e.g., by mechanical disruption of the cells by maceration of the leaves. During this process colourless catechins in the leaves are converted to a complex mixture of yellow and orange to dark-brown polyphenolic substances. Alternately and preferably the aqueous tea extract could be spent or waste condensate streams from processes for preparing hot instant tea/iced tea.

Many volatile compounds contribute to the aroma of tea. A list of most of the aroma volatile compounds is reported in 'Tea—Cultivation to Consumption' edited by K. C. Wilson & M. N. Clifford & published by Chapman & Hall (1992). Some of the important tea aroma compounds from this list are acetaldehyde, benzaldehyde, benzyl alcohol, t,t-2,4-decadienal, b-damascenone, diacetyl, geraniol, c-4-heptenal, t,t-2, 4-heptadienal, t-2-heptanal, 2,4-hexadienol, 1-hexanal, 1-hexanol, hexanoic acid, c-3-hexenol, t-2-hexenal, b-ionone, linalool & its oxides, methional, 2-methyl butanal, 3-methyl butanal, 2-methyl propanal, methyl sulphide, methyl salicylate, nerol, t-2,c-6-nonadienal, t,t-2,4-nonadienal, nonanal, octanal, t-2-octenal, 1-octene-3-ol, 1-pentanol, t-2-pentenal, 1-penten-3-ol, phenylacetaldehyde, 2-phenylethanol, a-terpenial, and vanillin.

A number of aqueous condensate streams containing aroma volatiles are available or potentially available from tea manufacturing processes. The concentration of aroma volatiles in these aqueous condensate streams range from 10 mg/l to 500 mg/l. Such streams include the one from aroma capture from the dryer exhaust in leaf tea manufacture described in WO 2007/039018. Aroma stripping from tea extraction processes before its concentration has been described in patents GB 855 423, GB 1 490 370 and U.S. Pat. No. 3,717,472. All these processes result in aqueous aroma condensates. Similarly, the condensate collected in the evaporation stage for concentration of soluble solids also has aroma volatiles, though at very low levels.

In the present invention, the volatile compounds can be recovered from waste streams which would otherwise have fetched no value. The invention has the advantage in that the volatile compounds are recovered and concentrated to a low water content. The invention also provides for concentrating the aroma compounds to a form of nearly pure oil. The concentration of the volatile compounds by the process of the invention provides for improved economy when they are added back to tea to prepare aroma enriched tea. Since the concentrate has low water content, tea to which it is added requires very little or no subsequent drying to prepare an aroma enriched tea product. Hence the process preferably comprises simply spraying the concentrate on to tea and packing the sprayed tea.

The first aspect of the present invention provides for a process for recovering volatile compounds from an aqueous tea extract comprising fractional distillation of said extract in a distillation assembly wherein the vapours are substantially condensed, the oil phase in the condensate is separated from the aqueous phase and the substantially oil-free aqueous phase is refluxed. The fractional distillation is preferably a multi-stage batch distillation.

The process preferably comprises substantial condensation of the overhead/rectified vapours. This may be achieved using cold traps, cold fingers or any other known condensation methods.

A preferred aspect of the invention provides for a process wherein the assembly contains less than 5 volume percent of non-condensable gases prior to charging the aqueous tea extract to said assembly.

A further preferred aspect provides for the distillation assembly to be substantially free of air or any other non-condensable gases before commencing the distillation operation. Most preferably the distillation assembly is filled with steam before commencing the distillation operation. By the phrase 'non-condensable gas' is meant to include those gases having a vapour pressure greater than 1 bar (absolute) at 0° C. Examples of commonly used non-condensable gases are air, oxygen, nitrogen, carbon dioxide, and helium.

The process of the invention is capable of recovering and concentrating aqueous tea extract which generally has 10 to 500 ppm of volatile compounds. Starting with such a concentration, the distillation process of the invention recovers and concentrates the aroma compounds to a concentration higher than 20000 ppm. It is also possible to concentrate it to nearly pure oil. The inventors have used all the recovery and concentration equipments known to them and available in the art for concentrating aqueous tea extracts and found that with known equipments, the extract could be concentrated by a factor of at most 40. Using the process of the invention, a concentration factor of greater than 80, sometimes greater than 100 could be obtained. It has also been found that out of the total amount of the volatile compounds in an aqueous tea extract, nearly 70 to 85 percent of the volatile compounds can be recovered by the process of the invention. Thus the losses are at most 30%.

The distillation assembly is preferably operated at substantially atmospheric pressure.

The distillation assembly used for the process of the invention generally comprises a reboiler, a distillation column, a condenser and a liquid-liquid separator. The process is optimally operated when the volume ratio of the total feed to the reboiler to the total condensate hold up in the condenser and liquid-liquid separator at the conclusion of the distillation operation is higher than 100, preferably in the range of 100 to 2000, more preferably in the range of 100 to 500.

A very important advantage of the present invention is that the process can be carried out at close to ambient conditions of pressure i.e. pressures close to atmospheric. The distillation is generally carried out with reboiler temperatures near 100° C., preferably in the temperature range of 80 to 100° C. The reboiler is heated to this temperature using any known heating means e.g. using a electrically heated resistance coils, or the reboiler could be jacketed and hot water or steam could be passed through the jacket to heat the material being distilled.

A suitable method of ensuring that the distillation assembly does not comprise more than 5% non-condensable gases before commencing the distillation operation, is to fill it up with steam while purging the air out of the assembly. Steam may be tapped form an external source e.g. a boiler and piped into the assembly. Alternately, a small amount of water is initially taken in the reboiler and all of the water is boiled off to steam to fill up the distillation assembly while the air is purged out of the assembly.

A preferred method of ensuring high recovery and minimizing loss of volatiles is by following a practice wherein the aqueous tea extract desired to be concentrated is not added to the reboiler at the start of the process. Initially, water, which comprises a small percentage e.g. 5 to 10 wt % of the total aqueous tea extract feed to be distilled, is added to the reboiler. The distillation operation is started with this feed and a total reflux is established. The operation is carried out till the air is purged from the column. Thereafter the aqueous tea extract is gradually added to the reboiler while ensuring that a reflux is maintained as the distillation process is carried out. It has been found that in a typical batch of 100 kg of aqueous tea extract, the distillation operation can generally be completed in a time of 4 to 6 hours.

The distillation assembly has a distillation column which is preferably filled with packings which preferably provides a low hold up in the range of 10 to 20%. To achieve this end, packings are generally chosen from structured packings, wire mesh packings, saddles or Raschig rings. The packed column for the process of the invention is generally kept short and usually does not require more than 10 equilibrium stages, preferably 3 to 5 equilibrium stages. Having such short columns also ensures lower equipment cost and thereby improves the commercial viability of the process. A preferred condition for carrying out the process of the invention comprises carrying out the distillation at a low boil-up rate, preferably in the range of 30 to 40% of flooding. The distillation is preferably carried out under near total reflux conditions.

The distillation assembly preferably has a condenser that is a shell and tube condenser, preferably vertically mounted. The vapors are preferably be fed to the vertical condenser from the top. The vapors are preferably be fed to the tube side of the condenser.

The distillation assembly is preferably operated at conditions that ensure minimal or substantially no internal reflux. This is ensured, for example, by providing good insulation on all the units and pipelines where flow of vapours occurs. Ensuring minimal or substantially no internal reflux is especially important during the start-up stage to ensure minimal loss and maximum recovery of volatile compounds. This is achieved, for example, by ensuring that the distillation column is externally heated during start-up. The heating may be by known method e.g. by providing steam in a jacket around the distillation column.

It has also been determined that the pipelines for transporting the vapours in the distillation assembly are preferably of a small diameter. It is especially preferred that the ratio of the diameter of the liquid-liquid separator to the diameter of the pipeline downstream of it is greater than 2, preferably in the range of 2 to 20, more preferably in the range of 10 to 20.

The invention will now be illustrated with the help of the following non-limiting drawings and examples.

BRIEF DESCRIPTION OF THE DRAWINGS

FIG. 1 is a schematic of an embodiment of the distillation assembly as per an aspect of the invention.

DETAILED DESCRIPTION OF THE DRAWINGS

As shown in FIG. 1 the distillation assembly comprises a reboiler (E1) equipped with a jacket (J1) to which aqueous tea extract can be added through valve (V1) and residue can be drained using valve (V2). The assembly is equipped with a packed column (E2) filled with Raschig ring packings. A vertical shell and tube heat exchanger (E3) is provided to condense the volatiles. A valve (V3) is provided on condenser (E3) to drain any condensate. A liquid-liquid separator (E4) is provided downstream of the condenser to collect the concentrated volatile compounds. Various liquid-liquid separators may be used. Preferred ratio of the volume of the reboiler to that of the liquid-liquid separator is in the range of 50 to 2000, more preferably in the range of 100 to 500. A valve (V4) is provided at the top of the liquid-liquid separator as an oil overflow valve. A product discharge valve (V6) as shown is provided to collect the concentrated volatile compounds. A reflux valve (V5) is provided to control the reflux ratio at which the distillation is carried out.

When in use, calculated amount of water is first added to the reboiler (E1), the water in the reboiler is heated by passing steam in the jacket (J1). As the water in the reboiler boils to form steam, the steam is allowed to fill up all parts of the distillation assembly, and the air is purged from the assembly using the various vent valves. When the distillation assembly is substantially filled up with the condensable gas viz. steam, the aqueous tea extract is added to the reboiler to begin the distillation. Initially a part of the total amount of tea extract is added to the reboiler. The overhead vapours are condensed in the condenser, the oil phase in the condensate is separated from the aqueous phase and the substantially oil-free aqueous phase is refluxed. The reflux valve is adjusted to the desired position to get the desired reflux ratio. As the process attains close to steady state operation, the rest of the tea extract is added intermittently to the reboiler. The reboiler is usually kept filled to 5 to 70 volume percent filling. As the distillation proceeds, the concentrated volatile compounds collect in the liquid-liquid separator (E4). At the end of the process, the concentrated volatile compounds are drained through valve (V6) and collected as desired.

EXAMPLES

Example-1

A batch of 20 L of aqueous tea extract having 200 mg/l of volatile aroma compounds was distilled using the process of the invention using the distillation assembly as shown in FIG. 1. In the distillation assembly, the volume of the reboiler was 40 liters. A two meter tall glass column filled with Sulzer BX packing was used. The volume of condensate collected was 1000 ml. About 3 liters of water was used initially to purge the air out of the assembly and to saturate it with steam prior to addition of the tea extract. A two-phase condensate appears almost at the start of distillation—the lighter phase being the oil phase while the heavier phase being the aqueous phase. Care was taken to separate the two phases and only the aqueous phase was refluxed to the distillation column during the entire operation. The results in terms of (a) percent of volatile compounds lost, (b) the concentration ratio and (c) the % recovery were determined and are summarized in Table-1.

Example-2

A batch at exactly the same conditions as in Example-1 was carried out except that no water was used to saturate the assembly prior to adding the tea extract. The distillation was started with air filled in the void spaces of the distillation assembly. The corresponding results are summarized in Table-1.

Example 3

A batch of 144 L of aqueous tea extract having 346 mg/l of volatile aroma compounds was distilled using the process of the invention using the distillation assembly as shown in FIG. 1. About 6 liters of water was used initially to purge the air out of the assembly and to saturate it with steam prior to addition of the tea extract. A two-phase condensate appears almost at the start of distillation—the lighter phase being the oil phase while the heavier phase being the aqueous phase. Care was taken to separate the two phases and only the aqueous phase was refluxed to the distillation column during the entire operation. The distillation was carried out by gradually adding the tea extract to the reboiler over a period of 8 hours. The total time of distillation was 10 hours. In the distillation assembly the volume of the reboiler was 200 liters. About 335 ml of total distillate product rich in aroma was recovered from the liquid-liquid separator of which 30 ml was aroma in pure oil phase. The corresponding results are summarized in Table-1.

Example-4

A batch of 100 L of aqueous tea extract having 302 mg/l of volatile aroma compounds was distilled using the process of the invention using the distillation assembly and the process similar to Example-3. About 800 ml of condensate rich in aroma was recovered from the liquid-liquid separator. The corresponding results are summarized in Table-1.

Example-5

A batch distillation run similar to Example-4 was carried out except that the reflux comprised of a mix of oil and aqueous phases. The corresponding results are summarized in Table-1.

In Table-1,

Concentration Ratio=Concentration of aroma compound in product/Concentration of aroma compound in feed The material balance of the aroma compounds is given by:

$F=P+B+L$

Where F is the amount of aroma compound in the feed, P is the amount of aroma compound in the product, B is the amount of aroma compound in the residue and L is the amount of aroma compound lost in the process.

% recovery=$P/F*100$

% losses=$L/P*100$

TABLE 1

| Example | % losses | Concentration ratio | % Recovery |
|---|---|---|---|
| Example-1 | 5 | 19 | 95 |
| Example-2 | 30 | 12 | 40 |
| Example-3 | 0 | 270 | 62 |
| Example-4 | 0 | 97 | 76 |
| Example-5 | 56 | 39 | 31 |

The data in Table-1 indicates that the loss of volatile aroma compounds in the examples as per the invention (Examples 1 to 4) is much less as compared to process of the prior art (Example 5). Also the % recovery in the examples as per the invention is significantly better then the example of the prior art. Further, with the process of the present invention, product having higher concentration of aroma compounds can be prepared as compared to the prior art.

Example 4 to 11

Experiments were conducted in a distillation assembly similar to that shown in FIG. 1 except that (i) the volume of the reboiler was 10 liters; (ii) the volume of the condenser was 43 ml and (iii) the column was 1 m long packed and had a diameter of 38 mm. It was packed with glass Raschig rings of diameter 12 mm and length 12 mm. Experiments were done to concentrate aqueous solutions of two model aroma compounds present in tea extract solution. The two model compounds used were 2-methyl propanal (which is a low boiling compound) and Linalool (which is a relatively high boiling compound). The experiments were conducted similar to Example-1 except that the following conditions were used:

In Experiments 6, 8 and 9 about three liters of feed were fed to the reboiler over the course of distillation. In Experiments 7, 10 and 11, about 5 liters of feed were fed to the reboiler over the course of distillation. In all the experiments 30% of the feed was boiled over.

Example-6, 7

The distillation was conducted after purging the assembly of air and filling with steam prior to the start of distillation. The feed was added gradually over a period of 3 hours and the total time of distillation was 4 hours.

Example-8, 10

The distillation was conducted starting with air present in the assembly. The reboiler was filled with all of the feed at the beginning of the experiment. The total time of distillation was 4 hours.

Example-9, 11

The distillation was conducted after purging the assembly of air and filling with nitrogen prior to start of distillation. Nitrogen flow was stopped gradually once the system filled up with the vapours of the feed. The total time of distillation was 4 hours.

The results on % recovery and % losses are summarized in Table-2.

TABLE 2

| Example | Model compound | Concentration in feed, mg/L | Concentration in product, mg/L | Concentration ratio | % recovery | % losses |
|---|---|---|---|---|---|---|
| 6 | 2-methyl propanal | 97 | 4905 | 51 | 54.8 | 15.0 |
| 8 | 2-methyl propanal | 133 | 950 | 7.2 | 6.6 | 92.4 |
| 9 | 2-methyl propanal | 96 | 721 | 7.5 | 7.3 | 91.4 |
| 7 | Linalool | 186 | 18900 | 101 | 88 | 4 |
| 10 | Linalool | 193 | 17515 | 91 | 78 | 15 |
| 11 | Linalool | 190 | 17195 | 91 | 79 | 15 |

The data in Table-2 indicates that superior recovery can be obtained using a preferred aspect of the invention (Examples 6 and 7). Further, the losses using the preferred process of the invention are much lower.

The invention claimed is:

1. A process for recovering volatile compounds from an aqueous tea extract comprising:
    providing a distillation assembly that contains less than 5 volume percent of non-condensable gases prior to commencing the distillation operation; wherein the distillation assembly is substantially free of air or any other non-condensable gas before commencing the distillation operation;
    distilling said extract at not less than 0.7 bar absolute pressure by fractional distillation comprising
        condensing of vapours, separating the oil phase condensate from the aqueous phase and refluxing the substantially oil-free aqueous phase;

wherein said fractional distillation is at near total reflux conditions.

2. A process as claimed in claim 1 wherein the distillation assembly is filled with steam before commencing the distillation operation.

3. A process as claimed in claim 1 wherein the distillation assembly comprises a reboiler, a distillation column, a condenser and a liquid-liquid separator wherein the volume ratio of the total feed to the reboiler to the total condensate hold up in the condensor and liquid-liquid separator at the conclusion of the distillation operation, is more than 100.

4. A process as claimed in claim 3 wherein said volume ratio is in the range of 100 to 2000.

5. A process as claimed in claim 1 wherein said distillation column has packings which provide a low hold up in the range of 10 to 20%.

6. A process as claimed in claim 1 wherein the ratio of the diameter of the condensate receiver to the diameter of the pipeline downsteam of it is in the range of 2 to 20.

7. A process as claimed in claim 1 comprising a relatively short packed column of 3 to 5 equilibrium stages.

8. A process as claimed in claim 1 wherein said condenser is a vertically mounted shell and tube condenser.

9. A process as claimed in claim 1 comprising distilling at a low boil-up rate in the range of 30 to 40% of flooding.

\* \* \* \* \*